(12) United States Patent
Rivera et al.

(10) Patent No.: US 12,198,081 B2
(45) Date of Patent: Jan. 14, 2025

(54) WORK ORDER GENERATION FOR POWER GENERATION SYSTEM

(71) Applicants: FLORIDA POWER & LIGHT COMPANY, Juno Beach, FL (US); Inventus Holdings, LLC, Juno Beach, FL (US)

(72) Inventors: Ricardo L. Rivera, Palm City, FL (US); Kevin K. Ogden, North Palm Beach, FL (US); Michael E. Willis, Jensen Beach, FL (US); Carlos A. Lizano, Pembroke Pines, FL (US); Sally A. Rosen, Jupiter, FL (US); Randall R. Wagner, De Pere, WI (US); Faye G. Spindler, Elkhart Lake, WI (US)

(73) Assignees: FLORIDA POWER & LIGHT COMPANY, Juno Beach, FL (US); INVENTUS HOLDINGS, LLC, Juno Beach, FL (US)

( * ) Notice: Subject to any disclaimer, the term of this patent is extended or adjusted under 35 U.S.C. 154(b) by 217 days.

(21) Appl. No.: 17/956,302

(22) Filed: Sep. 29, 2022

(65) Prior Publication Data
US 2024/0112105 A1    Apr. 4, 2024

(51) Int. Cl.
*G06Q 10/0631*    (2023.01)
*G06Q 10/20*    (2023.01)
*G06Q 50/06*    (2024.01)

(52) U.S. Cl.
CPC ........... *G06Q 10/063118* (2013.01); *G06Q 10/063112* (2013.01); *G06Q 10/20* (2013.01); *G06Q 50/06* (2013.01)

(58) Field of Classification Search
CPC ........................................ G06Q 10/00–50/00
USPC ............................................. 705/7.11–7.42
See application file for complete search history.

(56) References Cited

U.S. PATENT DOCUMENTS

| 4,383,298 | A | * | 5/1983 | Huff | G07C 3/00 705/28 |
| 4,852,001 | A | * | 7/1989 | Tsushima | G06Q 10/06 700/99 |
| 5,093,794 | A | * | 3/1992 | Howie | G05B 19/41865 700/100 |
| 7,467,161 | B2 | * | 12/2008 | Frisina | G05B 19/41865 715/224 |

(Continued)

*Primary Examiner* — Alan S Miller
(74) *Attorney, Agent, or Firm* — Tarolli, Sundheim, Covell & Tummino LLP

(57) ABSTRACT

A work request interface receives work request data for a power generation system. The work request data includes a work request having data characterizing equipment of the power generation system and a first state of the equipment. The work request interface processes the work request to modify at least one field in the work request to provide a standardized work request. The standardized work request includes data characterizing operations needed to change a state of the equipment from the first state to a second state. A work order generator receives the standardized work request and determines a priority of the standardized work request. The work order generator determines a mode of operation of the power generation system needed to change the state of the equipment from the first state to the second state and generates a set of work orders for the work request.

20 Claims, 3 Drawing Sheets

(56) References Cited

U.S. PATENT DOCUMENTS

| | | | | |
|---|---|---|---|---|
| 8,266,066 | B1* | 9/2012 | Wezter | G06Q 10/06 703/20 |
| 10,933,895 | B2* | 3/2021 | Setiawan | B61L 27/57 |
| 11,138,816 | B1* | 10/2021 | Bechhoefer | G07C 5/085 |
| 11,164,118 | B1* | 11/2021 | Doan | G06F 18/211 |
| 2002/0035495 | A1* | 3/2002 | Spira | G06Q 10/0637 705/7.36 |
| 2002/0065700 | A1* | 5/2002 | Powell | G06Q 10/06 705/7.14 |
| 2004/0019515 | A1* | 1/2004 | Senyurt | G06Q 10/06311 705/7.13 |
| 2007/0247331 | A1* | 10/2007 | Angelis | G01D 4/006 340/870.02 |
| 2009/0281674 | A1* | 11/2009 | Taft | H02J 3/0073 700/286 |
| 2010/0114641 | A1* | 5/2010 | Coffman | G06Q 10/06 705/7.22 |
| 2010/0324962 | A1* | 12/2010 | Nesler | G05B 17/02 705/412 |
| 2015/0185716 | A1* | 7/2015 | Wichmann | F02C 9/28 700/287 |
| 2017/0017903 | A1* | 1/2017 | Gray | G06T 11/60 |
| 2017/0091791 | A1* | 3/2017 | Srinivasan | G06N 5/04 |
| 2017/0117064 | A1* | 4/2017 | Lepine | G21C 17/00 |
| 2017/0242081 | A1* | 8/2017 | Kemp, Jr. | G01R 31/40 |
| 2018/0165641 | A1* | 6/2018 | Liberman | G06Q 10/0875 |
| 2021/0302953 | A1* | 9/2021 | Zhou | G05B 23/0283 |
| 2021/0365855 | A1* | 11/2021 | Doan | G06Q 10/06311 |
| 2021/0390493 | A1* | 12/2021 | Murai | G06Q 10/063112 |
| 2022/0391854 | A1* | 12/2022 | Viswanath | G06Q 10/20 |
| 2023/0385324 | A1* | 11/2023 | Bukhamsin | G06F 16/353 |

* cited by examiner

WORK ORDER GENERATION FOR POWER GENERATION SYSTEM

TECHNICAL FIELD

The present disclosure relates to power generation and more particularly to systems and methods for processing work requests for a power generation system to generate work orders.

BACKGROUND

A work order is usually a task or a job for a customer that can be scheduled or assigned to someone. Such an order may be from a customer request or created internally within the organization. Work orders may also be created as follow ups to Inspections or Audits. A work order may be for products or services.

Machine learning is a subset of artificial intelligence in the field of computer science that employs statistical techniques to give computers the ability to "learn" (e.g., progressively improve performance on a specific task) with data, without being explicitly programmed. More particularly, machine learning algorithms build a mathematical model based on sample data, known as "training data", in order to make predictions or decisions without being explicitly programmed to perform the task.

SUMMARY

One example relates to a non-transitory machine readable medium having machine readable instructions for a work order processor. The machine readable instructions include a work request interface that receives work request data for a power generation system. The work request data includes a work request having data characterizing equipment of the power generation system and a first state of the equipment. The work request interface also processes the work request to modify at least one field in the work request to provide a standardized work request. The standardized work request includes data characterizing operations needed to change a state of the equipment from the first state to a second state. The machine readable instructions also include a work order generator that receives the standardized work request and determines a priority of the standardized work request. The work order generator determines a mode of operation of the power generation system needed to change the state of the equipment from the first state to the second state. The work order generator also generates a set of work orders for the work request. The set of work orders identify the equipment, the determined priority, the operations needed to change the equipment from the first state to the second state and a skill set needed for each work order of the set of work orders.

Another example relates to a system for generating work orders of a nuclear power generation system. The system includes a work order processor executing on one or more computing platforms. The work order processor includes a work request interface that receives work request data for a power generation system. The work request data includes a work request having data characterizing equipment of the power generation system and a first state of the equipment. The work order processor processes the work request to modify at least one field in the work request to provide a standardized work request. The standardized work request includes data characterizing operations needed to change a state of the equipment from the first state to a second state. The work order processor also includes a work order generator that receives the standardized work request and determines a priority of the standardized work request. The work order generator determines a mode of operation of the power generation system needed to change a state of the equipment from the first state to the second state. The work order generator also generates a set of work orders for the work request. The set of work orders identify the equipment, the determined priority, the operations needed to change the equipment from the first state to the second state and a skill set needed for each work order of the set of work orders. The system also includes a scheduler operating on the one or more computing platforms that receives the set of work orders and determines a schedule for executing the set of work orders. The scheduler selects and deploys one or more service crews to execute the operations needed to change the equipment from the first state to the second state based on the skill set needed for each work order of the set of work orders.

Yet another example relates to a method for generating work orders for a power generation system. The method includes receiving, at a work request interface executing on one or more computing platforms, work request data for a power generation system. The work request data includes a work request having data characterizing equipment of the power generation system and a first state of the equipment. The method also includes processing, at a work request pipeline executing on the one or more computing platforms, the work request to modify at least one field in the work request to provide a standardized work request. The standardized work request includes data characterizing operations needed to change a state of the equipment from the first state to a second state. The method further includes receiving, at a work request generator executing on the one or more computing platforms, the standardized work request and determining, by the work request generator, a priority of the standardized work request. The method includes determining, by the work request generator, a mode of operation of the power generation system needed to change the state of the equipment from the first state to the second state. The method also includes generating, by the work request generator, a set of work orders for the work request. The set of work orders identify the equipment, the determined priority, the operations needed to change the equipment from the first state to the second state and a skill set needed for each work order of the set of work orders.

DETAILED DESCRIPTION'

Figure 1:
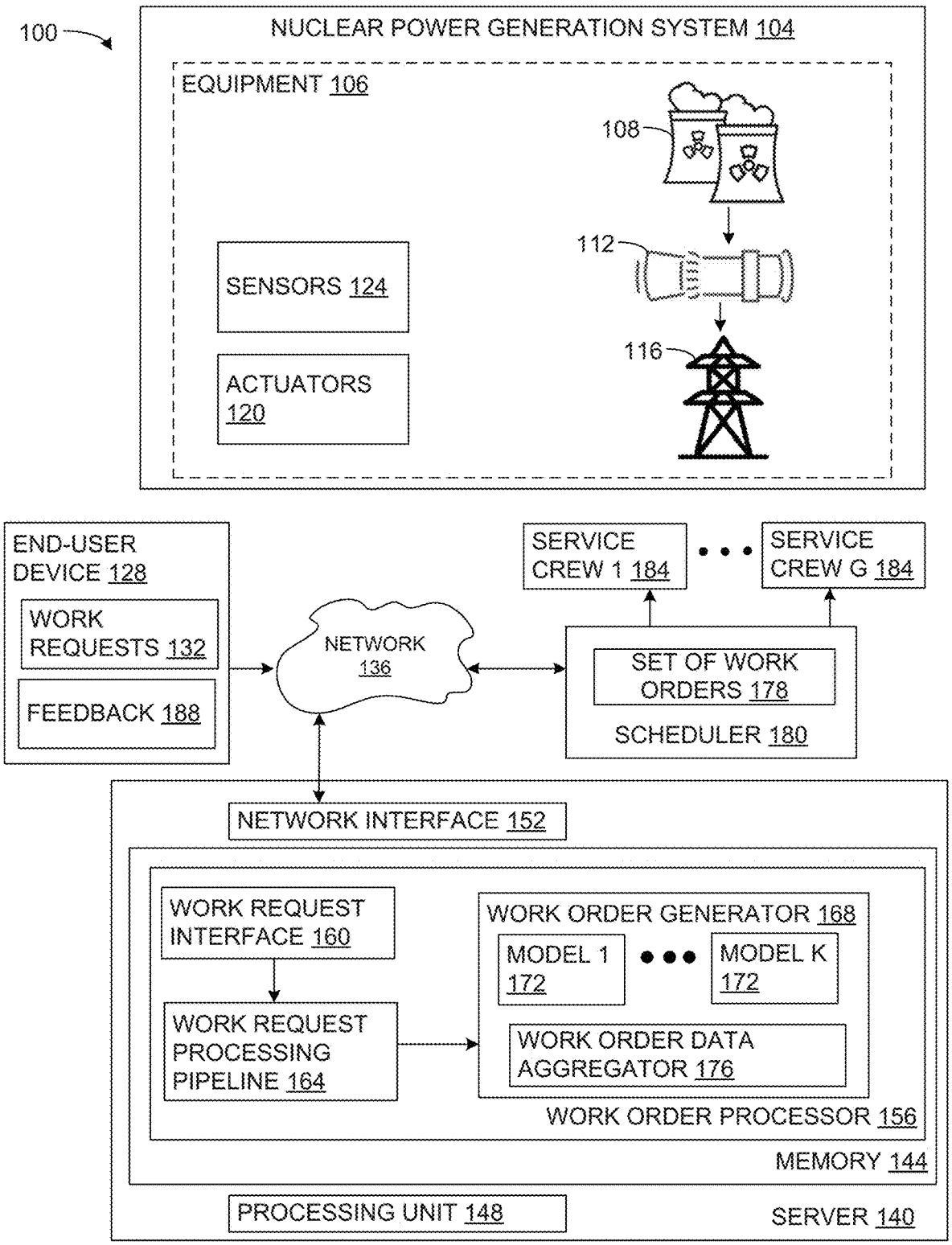
FIG. 1 illustrates a block diagram of an example of a system for generating work orders of a nuclear power generation system.

This disclosure relates to a work request processor (e.g., a tool) operating on a computing platform that can provide a work order (e.g., a task or a job at a scheduled time) for a maintenance of equipment at a power generation system such as a nuclear reactor, or a nuclear power plant, more generally. The work request processor can provide a work order that is more effective in contrast to manual techniques that rely on human interaction and processing. Thus, the work request processor can improve an accuracy of maintenance tasks.

A work request interface operates on the computing platform and communicates with the work request processor. The work request interface receives work request data that includes work requests. The work requests identify the equipment (e.g., make, module, type, etc.), work description (e.g., description of a problem with the equipment and the operations needed to fix the equipment), a system in which the equipment is located, and other relevant information (e.g., work order title, workers name, work location, etc.) The work request interface provides the work request data (including the work requests) to a work request processing pipeline configured to standardize the data, process text (e.g., using natural language processing (NLP) techniques), and encode equipment information and categorical information. The work request processing pipeline can determine operations for a corresponding work order that needs to be performed on the equipment identified in the corresponding work request. The work request processing pipeline can provide a standardized work request for a given work order to a work order generator executing on the computing platform.

The work order generator includes trained machine learning models for processing relevant data from the pipelined work request data for the generation of a set of work orders for the equipment. Data outputted by the trained machine learning modules (as described below) can be provided to a work order data aggregator that can be programmed to combine relevant outputted machine learning data to provide the work order for the equipment. The work order generator includes an outage module that can predict whether equipment identified in a given work request will need to be completed during a plant outage in order to execute the operations needed to fix the equipment. To make this prediction for the work order, the work order generator provides the outage model with the standardized work request that includes a description of the work, the location of work, equipment information, the system in which the equipment operates, and several aggregations of a number of equipment types or groups that have had outage work done previously. The outage model can output outage data to indicate whether the equipment for the given work request can be completed during the plant outage.

The work order generator also includes a priority model that is another machine learning generated model. The priority model predicts the priority of the work request based on an array of categorical variables, for example, the system code, equipment class, functional importance determination and single point vulnerability. The priority module can be programmed to provide priority data indicating a priority of the work further based on the work order request.

The work order generator further includes a unit condition model that can determine a reactor stage (alternatively referred to as a reactor phase) for a reactor of the power generation system (e.g. a nuclear power plant) for maintenance of the equipment identified in the given work request. The unit condition model can output unit condition data identifying the reactor stage based on the outage data and the priority data, as well as a system operability status. The work order generator further includes a nuclear applicable mode module that uses several categorical properties of work order tasks. The nuclear applicable mode module can determine a nuclear applicability of the work request based on the priority data, the unit condition data and the outage data. The nuclear applicable mode module can provide nuclear applicability data characterizing the nuclear applicability of the work request.

The work order generator module further includes a package type model that can predict a complexity and/or risk for implementing maintenance of the equipment. The package type model can generate instructions commensurate with the complexity and the package type model can output package data. The work order generator further includes a discipline module that can predict one or more disciplines (e.g., electrical department, chemical department, etc.) for implementing the maintenance of the equipment characterized in the work order request. Such disciplines reflect a nature and/or type of work needed for the work order request, such that a technician with the correct skills (e.g., electrical skills, knowledge of chemistry, mechanical skills, etc.) will be assigned a corresponding work order. The discipline module can provide discipline data identifying each discipline for equipment maintenance based on the work order request and the craft skills needed to perform the work.

Based on the determinations of the outage model, the priority model, the nuclear applicable model, the discipline model, the unit condition model and the package type model, the work order generator can generate a set of work orders for work requests in the work request data, including a work request for the given work order. The set of work orders can include one or more work orders that specify operations to provide maintenance to the equipment identified in the given work order. For instance, suppose that the set of work orders were related to fixing a leaking valve, wherein the valve was unreachable. In this case, the set of work orders can include, for example, operations related to setting up scaffolding, operating on the identified equipment and removing the scaffolding. Accordingly, in this example, there might be three different work orders, that may be completed by different operators (or teams of operators) in a specific sequence.

FIG. 1 illustrates a system 100 for generating work orders for a nuclear power generation system 104. The nuclear power generation system 104 includes equipment 106 for generating electrical power and for providing the electrical power to external consumers. The nuclear power generation system 104 includes a nuclear reactor 108 (e.g., an atomic pile) that generates steam that is provided to a steam turbine 112. The steam from the nuclear reactor 108 causes the steam turbines to generate electricity that is provided to a power distribution interface 116. The power distribution interface 116 can be representative of electrical equipment (e.g., transformers and/or electrical towers) that are employed to transmit electricity to external systems, such as end-user premises. The equipment 106 of the nuclear power generation system 104 can be integrated with one or more of the nuclear reactor 108, the steam turbine 112 or the power distribution interface 116 (or integrated with another part of the nuclear power generation system 104). The equipment 106 represents, for example, valves, gears, motors, nuclear fuel, etc.

The equipment 106 of the nuclear power generation system 104 includes actuators 120 for controlling operations of the equipment of the nuclear power generation system 104. The equipment 106 of the nuclear power generation system 104 also includes sensors 124 for monitoring operations of the equipment of the nuclear power generation system 104. As some examples, the actuators 120 can be implemented as motors, solenoids, etc. that can change state to modify a condition of the nuclear power generation system 104. For instance, if a given actuator 120 is a solenoid coupled to a valve, actuation of the solenoid could, for example, cause the valve to open or close. The sensors 124 can be representative of any equipment that reports a state of another instance of the equipment 106. As some examples, the sensor 124 can be temperature sensors, pressure sensors, photo-eyes, cameras, etc.

The nuclear power generation system 104 has operational cycles and operational states. For example, the nuclear reactor 108 can be online, offline (e.g., shutdown) as well as in one of a plurality of nuclear reactor stages (phases of operation). In some examples, there are six (6) or more stages of the nuclear reactor 108 that corresponds to a temperature and pressure of the nuclear reactor 108. For example, in a first stage, the nuclear reactor 108 is fully operational. In a second stage, the nuclear reactor 108 operates in a lower energy state and a lower pressure than the first stage. In a third stage, the nuclear reactor 108 operates in a lower energy state and a lower pressure than the second stage. This trend of lowering energy and pressure continues to the sixth stage (e.g., which has a lower energy and pressure than a fifth stage), which is presumed to be a minimal power and minimal pressure needed to operate the nuclear reactor 108. For an energy state and pressure lower than the sixth stage, it is presumed that the nuclear reactor 108 is offline.

Operators and/or maintenance crews of the nuclear power generation system 104 periodically and/or asynchronously inspect the nuclear power generation system 104. More particularly, the operators and/or maintenance crew inspect the equipment 106 of the nuclear power generation system 104 to ensure proper operation. For instance, the operators and/or maintenance crew inspect the sensors 124 and the actuators 120 to ensure that the items are operating correctly. Additionally, the operators and/or maintenance crews inspect the nuclear reactor 108, the steam turbine 112 and the power distribution interface 116 to ensure that these systems are operating correctly.

The operators and/or maintenance crews employ an end-user device 128 to generate work requests 132. The end-user device 128 can be, for example, computing devices, such as portable computing devices (e.g., tablet computers, smart phones, laptop computers, etc.). Alternatively, the end-user device 128 can be desktop computers. Although only a single end-user device 128 is illustrated in the present example, in other examples, there are multiple end-user devices. The end-user device 128 communicates on a network 136. The network 136 can be implemented, for example, as a public network (e.g., the Internet) a private network (e.g., a utility network) or a combination thereof.

The work requests 132 are generated in response to user input. In some examples, the work requests 132 are generated by filling digital forms output by the end-user device 128. In some examples, the digital forms are provided on a web page accessed by the end-user device 128. In other examples, the digital forms are provided on application software executing on the end-user device 128. In any such situation, the user input provided to generate the work requests 132 describes equipment 106 of the nuclear power generation system 104 that may need service based on observations of the user of the end-user device 128 (e.g., an operator and/or maintenance crew member of the nuclear power generation system 104).

Each work request 132 includes a title, a unique identifier for one or more instances of equipment, a description of the issue observed and a recommended action. More generally, in various examples, each work request 132 can include data identifying the equipment (e.g., make, module, type, etc.), work description (e.g., description of a problem with the equipment and the operations needed to fix the equipment), a system in which the equipment is located, and other relevant information (e.g., work order title, workers name, work location, etc.) In general, the recommended action describes changing a state of the corresponding equipment from a first state (e.g., damaged) to a second state (e.g., functioning properly). Additionally, in some examples each work request 132 can be associated with one or more images that attempt to illustrate the issue corresponding to the work request 132.

As a first example (hereinafter, "the first example"), suppose that a work request 132 identifies a specific valve based on a readout of a corresponding sensor 124 (e.g., a pressure sensor). Thus, in the first example, suppose that the pressure sensor indicated that the particular valve is leaking. In the first example, the work request 132 could have a title of "leaking pressure valve". The work request 132 in the first example generated can provide a unique identifier for the pressure sensor (e.g., an index number, such as "pressure valve 195-12-1"). The work requests 132 in the first example further includes a description of the observed issue, which could be "Pressure sensor for valve indicates a loss of pressure of about 4 pascal (Pa)." In the first example, the recommended action for the work request 132 could be "Replace valve".

As a second example, (hereinafter, "the second example"), suppose that a hairline crevice is identified in a cover of the steam turbine 112. In the second example, suppose that the hairline crevice is identified with direct visual inspection. In the second example, the associated work request 132 could be assigned a title of, "Indication in Steam Turbine". Additionally, in the second example, the associated work request could uniquely identify the particular steam turbine 112 and the region of the hairline crevice. Thus, in the second example, the work request 132 could have an equipment identifier of "outer cover of steam turbine 2". In the second example, the work request could have a description of "Indication of about 0.5 meters extending in a vertical direction on left side of the steam turbine". Further, in the second example, the recommended action could be, "repair indication".

The system 100 includes a server 140 that communicates on the network 136. The server 140 includes a non-transitory memory 144 for storing data and machine-readable instructions. The non-transitory memory 144 can be implemented as a non-transitory machine readable medium, such as volatile memory (e.g., random access memory), nonvolatile memory (e.g., a hard disk drive, a solid state drive, flash memory, etc.) or a combination thereof. The server 140 also includes a processing unit 148 for accessing the memory 144 and executing the machine-readable instructions. The server 140 can communicate with the network 136 through a network interface 152, such as a network interface card or other device.

The server 140 provides a computing platform. In some examples, the server 140 could be implemented in a computing cloud. In such a situation, features of the server 140, such as the processing unit 148, the network interface 152, and the memory 144 could be representative of a single instance of hardware or multiple instances of hardware with applications executing across the multiple of instances (i.e., distributed) of hardware (e.g., computers, routers, memory, processors, or a combination thereof). Alternatively, the server 140 could be implemented on a single dedicated server.

The memory 144 includes a work order processor 156 that is programmed/configured to process the work requests 132 and to generate work orders corresponding to the work requests 132 (or some subset thereof). More specifically, the work order processor 156 includes a work request interface 160 that receives the work requests 132 from the end-user devices 128 embedded in work request data. The work request interface 160 provides work request data characterizing the work requests 132 to a work request processing pipeline 164, a module of the work order processor 156.

In response to the work request data, the work request processing pipeline 164 is programmed/configured to standardize the work request data, process text of the work requests 132 embedded in the work request data (e.g., using natural language processing (NLP) techniques), and encode equipment information and categorical information. For example, in some situations, pictures of the equipment 106 identified in a corresponding work order can be added by the work request processing pipeline 164.

Additionally, the work request processing pipeline 164 identifies operations needed to change the equipment 106 of a corresponding work request 132 from the first state (e.g., a state needing maintenance) to the second state (e.g., a fully operational state). In some situations, the work request processing pipeline 164 adds operations for a work order to form a sequence of operations that are needed to change the equipment 106 from the first state to the second state. The work request processing pipeline 164 determines the operations needed for each given work request 132 using a machine learning model (e.g., generated with random forest techniques) that employs similarity between the current work request 132 and previously generated work orders to produce a list of operations for a work order that likely need to be completed for the work request 132. The machine learning module can employ collaborative filtering techniques to analyze the tasks in the previously generated work orders. In some examples, the work request processing pipeline 164 updates fields of the work requests 132 included in the work order data with data from external sources. For instance, in examples where the equipment 106 is inaccessible to a ground level, the work request processing pipeline 164 can add operations related to adding and/or removing scaffolding to access corresponding equipment. Accordingly, the work request processing pipeline 164 can add tasks for the work order, such as the building and removing of scaffolding even when the description or recommended action of the work request 132 does not mention scaffolding, the model for the work request processing pipeline would take features of the work request such as the equipment, system, location, and others and compare those to previous work orders, some of which would include a scaffolding task.

The work request processing pipeline 164 can provide a standardized work request and the tasks for the work order for each received work request 132 to a work order generator 168 of the work order processor 156. The work order generator 168 includes K number of trained machine learning models 172 for processing relevant data from the standardized work requests provided from the work request processing pipeline 164 for the generation of a set of work orders for the equipment, where K is an integer greater than or equal to one. Data outputted by the K number of trained machine learning models 172 can be provided to a work order data aggregator 176 module of the work order processor 156 that can be programmed to combine relevant outputted machine learning data to provide a work order for the equipment 106 of the nuclear power generation system 104. In some examples, the K number of trained machine learning models 172 are generated with random forest machine learning techniques. In other examples, other types of machine learning algorithms are employable to generate the K number of trained machine learning models 172 or some subset thereof.

Figure 2:
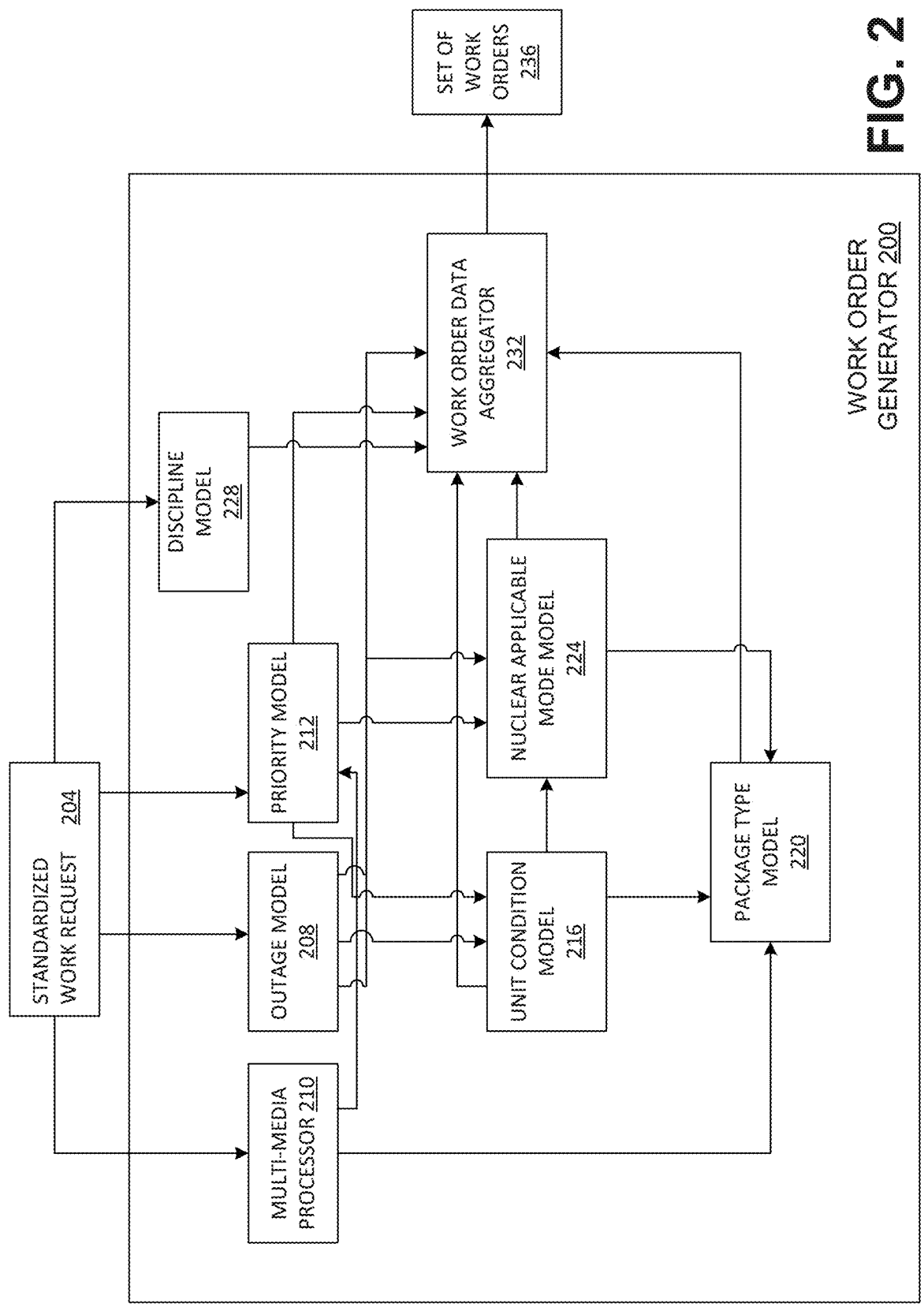
FIG. 2 illustrates a block diagram of a work order generator.

FIG. 2 illustrates an example of a work order generator 200 that is employable to implement the work order generator 168 of FIG. 1. In the example illustrated, the work order generator 200 receives a standardized work request 204 that could be provided as a portion of work order data from a work request processing pipeline (e.g., the work request processing pipeline 164 of FIG. 1). The standardized work request 204 is processed by machine learning trained models of the work order generator 200, which are employable to implement the K number of trained machine learning models 172 of FIG. 1.

More specifically, the work order generator 200 includes an outage model 208 (e.g., a software module) that can predict whether equipment identified in the standardized work request 204 will need to be completed during a plant outage of a nuclear power plant (e.g., the nuclear power generation system 104 of FIG. 1) in order to execute the operations needed to fix the equipment. To predict the outage indicator of the work order, the outage model 208 processes the description of the work, the location of work, equipment information, the system in which the equipment operates, and several aggregations of a number of equipment types or groups that have had outage work done previously. The outage model 208 can output outage data to indicate whether the equipment for the standardized work request 204 can be completed during the plant outage, which can entail a shutdown of a nuclear reactor (e.g., the nuclear reactor 108 of FIG. 1) and/or a steam turbine (e.g., the steam turbine 112 of FIG. 1).

The work order generator 200 includes a plurality of other machine learning trained models that are implemented as software modules. These machine learning trained models include a multi-media processor 210, a priority model 212, a unit condition model 216, a package type model 220, a nuclear applicable mode model 224, a discipline model 228 and a work order data aggregator 232.

The multi-media processor 210 can process images, audio and/or videos associated with the standardized work request 204 to determine multi-media data. The multi-media data identifies equipment present in the images, audio and/or videos. Additionally, in some examples, through processing of the images, the audio and/or the video, the multi-media processor 210 can provide sufficient information to prepare a recommendation for correcting an issue in the standardized work request 204. For instance, suppose that the standardized work request 204 included an image of a valve. In this example, the multi-media processor 210 could process an image of the valve to determine a serial number and/or model of the valve (in which the serial number could be present in the image of the valve). Additionally, in this example, suppose that the multi-media processor 210 has historical data indicating that the particular model of the valve needs frequent cleaning. Thus, in this example, the multi-media data can identify the serial number and model of the valve, as well as a recommendation for cleaning the valve.

The priority model 212 predicts the priority of the standardized work request 204 based on the multi-media data and on an array of categorical variables, for example, the system code, equipment class, functional importance determination and single point vulnerability. The priority model 212 can be programmed to provide priority data indicating a priority of the work characterized in the work order request 204.

The unit condition model 216 can receive the outage data and the priority data to determine a reactor stage needed for a reactor (e.g., the nuclear reactor 108 of FIG. 1) of the power generation system (e.g. a nuclear power plant) for maintenance of the equipment identified in the given work request. More generally, the unit condition model 216 determines when equipment for the standardized work request 204 can be worked on based on outage considerations as well as the status that the power generation system (of which the equipment for the standardized work request 204 is a component) should be in for work to be executed. To make this determination, the unit condition model 216 can analyze a history of work performed on this equipment. The unit condition model 216 can output unit condition data identifying the reactor stage based on the outage data and the priority data.

The nuclear applicable mode model 224 uses several categorical properties of operations for the standardized work request 204. The nuclear applicable mode model 224 can determine a nuclear applicability of the work request based on the unit condition data, the outage data and the priority data. The nuclear applicable mode model 224 can provide nuclear applicability data characterizing the nuclear applicability of the standardized work request 204. The nuclear applicable mode model 224 employs a modified random forest classifier that considers only valid modes for the nuclear reactor based on the outage data provided by the outage model 208. The nuclear applicable mode model 224 is configured to select the valid mode with the greatest predicted probability for successful execution of the operations in the standardized work request 204.

The package type model 220 receives the unit condition data, the multi-media data and the nuclear applicability data. The package type model 220 implements a random forest classifier with estimators (e.g., 120 estimators) and balanced weights. The input data includes values from equipment name, location, description, and detailed description, combined with encoded categorical data. The package type model 220 employs this information to determine a complexity and/or risk associated with executing the tasks for the standardized work request 204, and employs data characterizing the complexity and/or risk in package data. The package type model 220 also determines a solution and the level of instructions needed for a worker to address problems identified in the work request. For example, the package type model 220 can determine if few (or no) instructions are needed to execute the tasks for the work request or if a particular set of tasks would require complex instructions. The package type model 220 provides instructions in the package data for executing the operations corresponding to the work request commensurate with the determined complexity, and the package type model 220 outputs the package data.

The discipline model 228 receives the standardized work request 204. The discipline model 228 analyzes the standardized work request 204 to predict one or more disciplines (e.g., electrical department, chemical department, etc.) for implementing the maintenance of the equipment identified in the work order. These disciplines reflect a nature and/or type of work needed for the standardized work order request 204. Accordingly, considering the nature and/or type of work needed for the standardized work request 204 ensures (or at least improves the chances) that a technician with the correct skills (e.g., electrical skills, knowledge of chemistry, mechanical skills, etc.) will be assigned a corresponding work order. The discipline model 228 provides discipline data identifying each discipline for equipment maintenance.

The work order data aggregator 232 receives the outage data from the outage model 208, the priority data from the priority model 212, the unit condition data from the unit condition model 216, the package data from the package type model 220, the nuclear applicability data from the nuclear applicable mode model 224 and the discipline data from the discipline model 228. Based on this data, the work order data aggregator 232 can generate a set of work orders 236 for work requests in the work request data, including a set of work orders 236 for the given work request. The set of work orders 236 can include one or more work orders that specify operations to provide maintenance to the equipment identified in the given work order 236. For instance, suppose that the set of work orders 236 were related to fixing a leaking valve, such as the first example, wherein the valve was unreachable. In this case, the set of work orders can include, for example, operations related to setting up scaffolding, operating on the identified equipment and removing the scaffolding. Accordingly, in this example, there might be three different work orders that may be completed by different operators (or teams of operators).

Referring back to FIG. 1, the work order data aggregator 176 provides a set of work orders 178 generated by the work order processor 156 to a scheduler 180 through the network 136. The scheduler 180 can be representative of application software executing on a computing platform. Moreover, although FIG. 1 illustrates the scheduler 180 and the work order processor 156 as being implemented on separate computing platforms, in other examples, the scheduler 180 and the work order processor 156 can be integrated to operate on the same computing platform, such as the server 140.

The work orders 178 generated by the work order processor 156 include an identification of equipment 106, a priority of the corresponding work order 178 and a unit condition required (e.g., offline/shutdown) and a package type that are determined by the work order generator 168. In some examples, multiple work orders 178 are associated with the same work request 132. For instance, there could be three work orders generated for the replacement of a valve where scaffolding is needed, namely, a first work order to install the scaffolding, a second work order to execute maintenance on the equipment 106 and a third work order to remove the scaffolding.

The scheduler 180 can screen the work orders 178. In some examples, some work orders 178 can be removed if it is determined that an uncompleted work order has already been issued for the same instance of equipment 106. Each work order 178 is assigned to a given service crew 184 of G number of service crews 184, where G is an integer greater than or equal to one. For instance, in some examples, the scheduler 180 determines the particular service crews 184 needed for a set of work orders 178 and the scheduling needed to execute each work order 178 in the set of work orders 178. Stated differently, the scheduler 180 can be programmed/configured to identify specific service crews 184 trained in the particular operations needed to complete the corresponding work order 178. For instance, in the first example, a particular service crew 184 skilled in valve replacement could be assigned a work order 178 corresponding to the work request 132 generated in the first example. Further, in some examples, the scheduler 180 can be configured to bundle multiple work orders 178 from different sets of work orders 178 (collected over time) to curtail component wear.

Additionally, the scheduler 180 is programmed/configured to distribute the work orders 178 at a time proximal to the time that each work order 178 can be executed. For example, suppose that a particular work order 178 indicates that the nuclear reactor 108 needs to be in an outage in order to be completed, and the next outage is schedule for 35 days in the future. In this case, the scheduler 180 could delay distribution of the particular work order 178 until a time near the outage until about 5 days prior to the outage.

Upon receipt of the work orders, the G number of service crews 184 can be deployed to complete the work orders. By utilizing the system 100, the work orders 178 are correctly and timely prioritized to ensure efficient operation of the nuclear power generation system 104. In particular, the work order generator 168 ensures that the proper skillset is identified to complete each work order 178, thereby curtailing the deployment of the wrong service crew for maintenance. Further, as described, in situations where an outage is required, but the priority for executing a particular work order 178 is low, the completion of the work order can be delayed until a next scheduled outage of the equipment 106 (e.g., the nuclear reactor 108).

Furthermore, the G number of service crews 184 can employ the end-user device 128 to provide feedback 188 characterizing observations made during execution of operations for a particular work order 178. The feedback 188 can be positive (e.g., the particular work order 178 accurately described the situation and the work needed) or negative (e.g., mistakes were made during generation of the particular work order 178). This feedback 188 can be provided to the work request processing pipeline 164 and/or the work order generator 168. The work request processing pipeline 164 and/or the work order generator 168 can thus employ the feedback 188 to update the machine learning models in a reinforcement learning operation.

By employing the system 100, accurate and timely work orders 178 are generated for the work requests 132. In particular, work orders 178 are generated and efficiently distributed to the correct service crews 184. Over time, conventional inefficiencies associated with untimely work orders and/or wrongly assigned work orders (based on the skill of the assigned service crews 184) are curtailed. In this manner, the work request processor 168 and the scheduler 180 can operate in concert to tune equipment maintenance and improve an overall equipment life cycle of the equipment 106, to curtail downtime at the nuclear power generation system 104 and improve safety at the nuclear power generation system 104.

Figure 3:
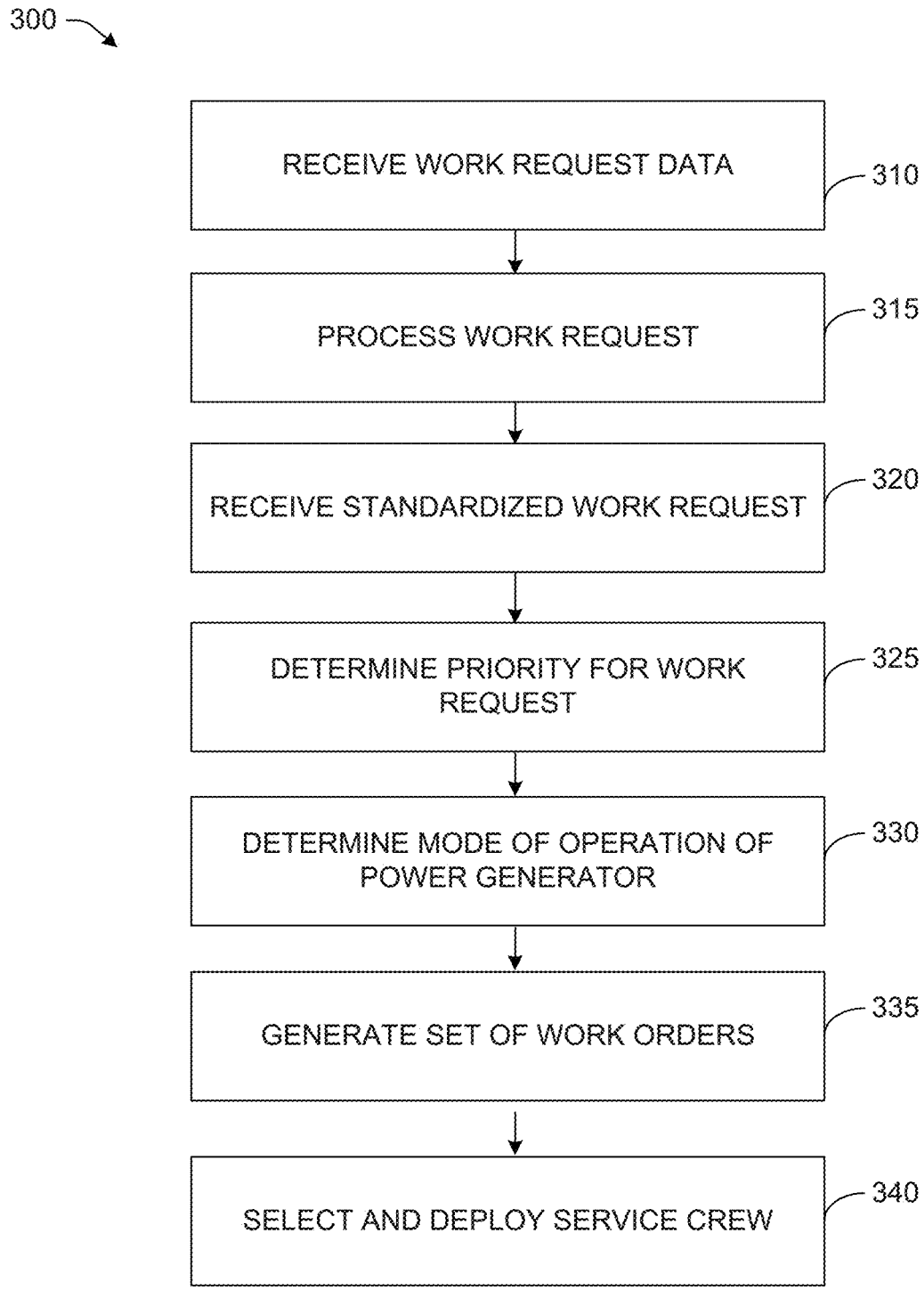
FIG. 3 illustrates a flowchart of an example method for generating work orders for a power generation system.

In view of the foregoing structural and functional features described above, an example method will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 3 illustrates a flow chart of a method 300 for generating work orders for a power generation system, such as the nuclear power generation system 104 of FIG. 1. The method 300 can be implemented by a computing platform, such as the server 140 of FIG. 1.

At 310, a work request interface (e.g., the work request interface 160 of FIG. 1) executing on the computing platform can receive work request data for the power generation system. The work request data includes a work request comprising data characterizing equipment of the power generation system and a first state of the equipment. At 315, a work request pipeline (e.g., the work request processing pipeline 164 of FIG. 1) executing on the computing platform can process the work request to modify at least one field in the work request to provide a standardized work request. The standardized work request includes data characterizing operations needed to change the state of the equipment from the first state to a second state.

At 320, a work order generator (e.g., the work order generator 168 of FIG. 1) executing on the one or more computing platforms receives the standardized work request. At 325, the work order generator determines a priority of the standardized work request. At 330, the work order generator determines a mode of operation of the power generation system needed to change the state of the equipment from the first state to the second state. At 335, the work order generator generates a set of work orders for the work request. The set of work orders identify the equipment, the determined priority, the operations needed to change the equipment from the first state to the second state and a skill set needed for each work order of the set of work orders.

At 340, a scheduler operating on the computing platform selects and deploys a service crew (or multiple service crews) to execute the operations needed to change the equipment from the first state to the second state based on the skill set needed for each work order of the set of work orders.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine readable instructions comprising:
   a work request interface of a work order processor that:
      receives work request data for a power generation system, wherein the work request data includes a work request comprising data characterizing equipment of the power generation system and a first state of the equipment;
      processes the work request to modify at least one field in the work request to provide a standardized work request, wherein the standardized work request includes data characterizing operations needed to change a state of the equipment from the first state to a second state; and
   a work order generator of a work order processor that:
      receives the standardized work request;
      determines a priority of the standardized work request;

determines a mode of operation of the power generation system needed to change the state of the equipment from the first state to the second state; and generates a set of work orders for the work request, wherein the set of work orders identify the equipment, the determined priority, the operations needed to change the equipment from the first state to the second state and a skill set needed for each work order of the set of work orders; and a scheduler that:

identifies that a work order of the set of work orders needs to be completed during an outage of the power generation system and delays distribution of the work order until a time proximate the outage of the power generation system.

2. The medium of claim 1, wherein the scheduler further receives the set of work orders and schedules the set of work orders for a plurality of service crews.

3. The medium of claim 1, wherein the power generation system comprises a nuclear reactor.

4. The medium of claim 3, wherein the work order generator comprises a multi-media processor that processes images, audio and/or video associated with the standardized work request to identify equipment.

5. The medium of claim 3, wherein the work order generator comprises:

an outage machine learning model that determines if the nuclear reactor needs to be shutdown in order to change the equipment from the first state to the second state; and a priority machine learning model that provides priority data characterizing the priority of the standardized work request.

6. The medium of claim 5, wherein the work order generator comprises a unit condition machine learning model that provides unit condition data characterizing a operational state of the nuclear reactor needed to execute the operations to change the state of the equipment from the first state to the second state.

7. The medium of claim 6, wherein the work order generator comprises a package type machine learning model that provides package data characterizing a complexity associated with the operations to change the state of the equipment from the first state to the second state and instructions for execution of the operations commensurate with the complexity associated with the operations.

8. The medium of claim 7, wherein the work order generator comprises a discipline machine learning model that provides discipline data characterizing a skill set needed for the operations to change the equipment from the first state to the second state.

9. The medium of claim 8, wherein the work order generator comprises a nuclear applicable mode machine learning model configured to determine nuclear applicability data that identifies a valid mode of the nuclear reactor with a greatest predicted probability for successful execution of the operations to change the equipment from the first state to the second state.

10. The medium of claim 9, wherein the work order generator comprises a work order data aggregator that aggregates data from the priority data, the nuclear applicability data, the discipline data, the unit condition data and the package data to generate the set of work orders for the work request.

11. A system for generating work orders of a nuclear power generation system comprising:

a work order processor executing on one or more computing platforms comprising:

a work request interface that:

receives work request data for a power generation system, wherein the work request data includes a work request comprising data characterizing equipment of the power generation system and a first state of the equipment; and processes the work request to modify at least one field in the work request to provide a standardized work request, wherein the standardized work request includes data characterizing operations needed to change a state of the equipment from the first state to a second state;

a work order generator that:

receives the standardized work request;

determines a priority of the standardized work request;

determines a mode of operation of the power generation system needed to change a state of the equipment from the first state to the second state; and generates a set of work orders for the work request, wherein the set of work orders identify the equipment, the determined priority, the operations needed to change the equipment from the first state to the second state and a skill set needed for each work order of the set of work orders; and a scheduler operating on the one or more computing platforms that:

receives the set of work orders;

determines a schedule for executing the set of work orders; and selects and deploys one or more service crews to execute the operations needed to change the equipment from the first state to the second state based on the skill set needed for each work order of the set of work orders; and identifies that a work order of the set of work orders needs to be completed during an outage of the power generation system and delays distribution of the work order until a time proximate the outage of the power generation system.

12. The system of claim 11, wherein the set of work orders comprises a plurality of work orders, and the scheduler selects a plurality of service crews to execute operations characterized in the set of work orders.

13. The system of claim 12, wherein the scheduler deploys the plurality of service crews in an ordered sequence for the plurality of work orders in the set of work orders.

14. The system of claim 11, wherein the work order generator comprises an outage machine learning model that determines whether a nuclear reactor of the nuclear power generation system needs to be shutdown in order to change the equipment from the first state to the second state.

15. The system of claim 14, wherein the work order generator comprises a priority machine learning model that provides priority data characterizing the priority of the standardized work request.

16. The system of claim 15, wherein the work order generator comprises a unit condition machine learning model that provides unit condition data characterizing a operational state of the nuclear reactor needed to execute the operations to change the state of the equipment from the first state to the second state.

17. The system of claim 16, wherein the work order generator comprises:

a package type machine learning model that provides package data characterizing a complexity associated with the operations to change the state of the equipment from the first state to the second state and instructions for execution of the operations commensurate with the complexity associated with the operations; and a discipline machine learning model that provides discipline data characterizing a skill set needed for the operations to change the equipment from the first state to the second state.

18. The system of claim 17, wherein the work order generator comprises a nuclear applicable mode machine learning model configured to determine nuclear applicability data that identifies a valid mode of the nuclear reactor with a greatest predicted probability for successful execution of the operations to change the equipment from the first state to the second state.

19. A method for generating work orders for a power generation system, the method comprising:

receiving, at a work request interface of a work order processor executing on one or more computing platforms, work request data for a power generation system, wherein the work request data includes a work request comprising data characterizing equipment of the power generation system and a first state of the equipment;

processing, at a work request pipeline of the work order processor executing on the one or more computing platforms, the work request to modify at least one field in the work request to provide a standardized work request, wherein the standardized work request includes data characterizing operations needed to change a state of the equipment from the first state to a second state;

receiving, at a work order generator of the work order processor executing on the one or more computing platforms, the standardized work request;

determining, by the work order generator, a priority of the standardized work request;

determining, by the work order generator, a mode of operation of the power generation system needed to change the state of the equipment from the first state to the second state;

generating, by the work order generator, a set of work orders for the work request, wherein the set of work orders identify the equipment, the determined priority, the operations needed to change the equipment from the first state to the second state and a skill set needed for each work order of the set of work orders; and identifying, by a scheduler executing on the one or more computing platforms, that a work order of the set of work orders needs to be completed during an outage of the power generation system and delays distribution of the work order until a time proximate the outage of the power generation system.

20. The method of claim 19, further comprising:

selecting and deploying, by the scheduler, one or more service crews to execute the operations needed to change the equipment from the first state to the second state based on the skill set needed for each work order of the set of work orders.

* * * * *